(12) United States Patent
Talvitie et al.

(10) Patent No.: US 9,733,404 B2
(45) Date of Patent: Aug. 15, 2017

(54) LAYERED STRUCTURE FOR AN INFRARED EMITTER, INFRARED EMITTER DEVICE AND DETECTOR

(71) Applicant: Vaisala Oyj, Vantaa (FI)

(72) Inventors: Hannu Talvitie, Espoo (FI); Jukka Korhonen, Espoo (FI); Martti Blomberg, Espoo (FI)

(73) Assignee: Vaisala Oyj, Vantaa, FL (US)

( * ) Notice: Subject to any disclaimer, the term of this patent is extended or adjusted under 35 U.S.C. 154(b) by 171 days.

(21) Appl. No.: 14/426,389

(22) PCT Filed: Sep. 5, 2013

(86) PCT No.: PCT/FI2013/050862
§ 371 (c)(1),
(2) Date: Mar. 6, 2015

(87) PCT Pub. No.: WO2014/037622
PCT Pub. Date: Mar. 13, 2014

(65) Prior Publication Data
US 2015/0241612 A1  Aug. 27, 2015

(30) Foreign Application Priority Data

Sep. 6, 2012  (FI) ...................... 20125920

(51) Int. Cl.
*G02B 5/22* (2006.01)
*G01J 5/20* (2006.01)
(Continued)

(52) U.S. Cl.
CPC ............. *G02B 5/22* (2013.01); *F21V 7/10* (2013.01); *G01J 3/108* (2013.01); *G01J 5/024* (2013.01); *G01J 5/048* (2013.01); *G01J 5/0809* (2013.01); *G01J 5/10* (2013.01); *G01J 5/20* (2013.01); *H01L 51/529* (2013.01); *H01L 51/5271* (2013.01); *H05B 3/84* (2013.01); *G01J 2005/103* (2013.01); *H05B 2203/013* (2013.01)

(58) Field of Classification Search
CPC ......... F21V 7/10; G01J 2005/13; G01J 3/108; G01J 5/024; G01J 5/048; G01J 5/0809; G01J 5/10; G01J 5/20; G02B 5/22; H01L 51/5271; H01L 51/529; H05B 2203/013; H05B 3/84
See application file for complete search history.

(56) References Cited

U.S. PATENT DOCUMENTS

| 6,177,673 B1 * | 1/2001 | Blomberg ............. G02B 5/22 250/338.4 |
| 2005/0122589 A1 * | 6/2005 | Bakker .................. G02B 1/11 359/591 |

(Continued)

FOREIGN PATENT DOCUMENTS

| EP | 1612540 B1 | 11/2009 |
| JP | 2004139649 A | 5/2004 |

(Continued)

OTHER PUBLICATIONS

Gawarikar,A.S. et al: Radiation efficiency of narrowband coherent thermal emitters.AIP Advances, online Jul. 18, 2012.

(Continued)

*Primary Examiner* — Francis M Legasse, Jr.
(74) *Attorney, Agent, or Firm* — Seppo Laine Oy

(57) ABSTRACT

The present publication describes a heat-resistant optical layered structure, a manufacturing method for a layered structure, and the use of a layered structure as a detector, emitter, and reflecting surface. The layered structure comprises a reflecting layer, an optical structure on top of the reflecting layer, and preferably shielding layers for shielding the reflecting layer and the optical structure. According to the invention, the optical structure on top of the reflecting layer comprises at least one partially transparent layer, which is optically fitted at a distance to the reflecting layer.

20 Claims, 4 Drawing Sheets

(51) Int. Cl.
    *H05B 3/84*     (2006.01)
    *G01J 5/04*     (2006.01)
    *G01J 3/10*     (2006.01)
    *G01J 5/02*     (2006.01)
    *F21V 7/10*     (2006.01)
    *G01J 5/08*     (2006.01)
    *G01J 5/10*     (2006.01)
    *H01L 51/52*     (2006.01)

(56) References Cited

U.S. PATENT DOCUMENTS

| | | | |
|---|---|---|---|
| 2006/0060784 A1* | 3/2006 | Moon | G01J 5/0853 |
| | | | 250/338.1 |
| 2012/0056112 A1 | 3/2012 | Bitter et al. | |
| 2013/0161515 A1* | 6/2013 | Park | G01J 5/0862 |
| | | | 250/338.1 |

FOREIGN PATENT DOCUMENTS

| | | |
|---|---|---|
| WO | WO2007070540 A2 | 6/2007 |
| WO | WO2008019059 A2 | 2/2008 |

OTHER PUBLICATIONS

Liddiard,K.C: Application of interferometric enchancement to self-absorbing thin film thermal detectors. Infrared Physics, 1993.

\* cited by examiner

LAYERED STRUCTURE FOR AN INFRARED EMITTER, INFRARED EMITTER DEVICE AND DETECTOR

FIELD OF TECHNOLOGY

The present invention relates to an optical layered structure according to the preamble to claim 1, suitable for emitter use. The invention also relates to a method for manufacturing an optical layered structure and the use of a layered structure.

Optical structures of this kind are used to emit electromagnetic radiation at a specific wavelength or frequency band. According to the principle of reciprocity, a good emitter is also a good absorber, so that the same optical structure can, suitably adapted, be also used as a detector, which absorbs electromagnetic radiation. In general, the optical structure is thus used to adapt the match the surface of the structure optically to its environment at a desired wavelength range and in a desired manner.

The electromagnetic radiation to be matched to the optical structure is more generally infrared radiation or visible light.

The structure applied to detector and/or emitter use can also be termed optically a black surface. At a specific wavelength range, a black surface refers, in the present application, to a layered structure in the surface, which absorbs (and correspondingly thus emits) radiation extremely well in the wavelength range in question. The emissivity of the structure is thus high in this wavelength range. At a specific wavelength range, a white surface refers, in turn, to a surface, which reflects radiation extremely well in the wavelength range in question, i.e. its emissivity is low. In many practical applications, the ideal optical structure would be optically black at a specific wavelength range and white or transparent outside this wavelength range. In this way, it is, among other things, possible to reduce disturbances outside the selected wavelength range.

Thus, generally an optically black surface can be used as an absorber of limited wavelength range in detectors of optical radiation, and as an emissive surface in thermal light sources. For example, in thermal infrared detectors, a surface is required that absorbs effectively infrared radiation in the desired wavelength range. Correspondingly, in infrared emitters, a surface is required that emits effectively.

PRIOR ART

Generally, many different simple heatable components or surfaces are known, which, when hot, emit electromagnetic radiation. Such a component is, for example, the filament of an incandescent lamp. A drawback with such simple components or surfaces, which are typically manufactured from a single material, is low emissivity and thus poor efficiency.

As is known, emissivity can be improved by means of a suitable layered structure. With the aid of an optical layered structure, it is also possible to affect the emission spectrum.

The manufacture of an optical layered structure suitable for emitter use is, however, very problematical, because the effective emitter use of the component requires a high temperature. For this reason, most of the known absorber structures are not in practice suitable for emitter use. On the other hand, a good emitter structure can also be used as an absorber, as good temperature resistance is not a drawback in detector use.

U.S. Pat. No. 6,177,673 discloses a layered structure, which is suitable for both emitter and detector use. However, to comprehensively understand the prior art, we will first of all examine some known detector structures.

The publication Liddiard K. C., Infrared Physics, 1993, vol. 34, 4, pp. 379—discloses a film layered structure, in which uppermost is a semipermeable metal thin film, under this a lossless dielectric layer, and on the bottom a second metal thin layer acting as an infrared mirror. The weakness of this construction is that it is difficult to manufacture the semipermeable metal thin film to be the correct thickness, and, in addition, being the outer surface of the detector, it is easily destroyed. Thus, the structure described in the publication cannot be used as an emitter, as the structure will not withstand the temperatures demanded in emitter use.

The publication Dobrzanski L. et al., Proc. Eurosensors X 1996, Löwen, pp. 1433—discloses a more developed structure of the previous one, in which the absorber is manufactured on top of a 100-200 µm thick silicon wafer. In this structure, first of all a 0.2-1.5 µm thick lossless film of silicon nitride is grown on top of the silicon wafer and then a 0.1-1.5 µm thick lossy film of doped polycrystalline silicon. Polycrystalline silicon has been chosen as the material of the upper film, because it withstands high temperatures and it has a reasonably large resistivity temperature factor. Under the silicon and silicon nitride films an infrared mirror is made by sputtering a layer of wolfram or an alloy of nickel and chromium from below, through openings made in the substrate.

There are several drawbacks in the structure depicted by Dobrzanski. The metalizing of the undersurface of the component is followed by the powerful conduction of heat horizontally to the substrate. The structure also cannot be used in thermal emitters, because metal films like those described do not sufficiently withstand high temperatures. In addition, a weakness of the structure is that it is extremely difficult to optimize the layer thicknesses according to both thermal and optical demands.

An attempt has been made to solve the problems relating to the structures depicted above with the aid of the optical structure disclosed in U.S. Pat. No. 6,177,673. The absorber presented in the patent is manufactured on top of a self-supporting insulating film. The self-supporting insulating film is, in turn, grown on top of a silicon substrate.

According to the patent, a metal mirror, a shielding film of insulating material on top of the metal mirror, and a lossy film on top of this, are grown on top of the self-supporting insulating film. The lossy film is manufactured from polycrystalline silicon (polysilicon) and it is doped with doping atoms. In the absorber described in the patent, the location of the absorption band on the wavelength axis is set as desired by suitably selecting the thickness of the polycrystalline silicon film and the doping. The structure is stated as being suitable also for emitter use, provided the lossy film is shielded with a shielding film.

Though the solution described in U.S. Pat. No. 6,177,673 is in many ways progressive and better than those known previously, the emissivity of the structure is unstable at high temperatures. The solution depicted by the patent can thus be used as an emitter, but it should be possible to improve the stability of the structure, so that it would be also suitable for demanding emitter applications.

SUMMARY OF THE INVENTION

The invention is intended to create a structure, which is stable and, if necessary, also suitable for use at high temperatures.

The invention is based on making the optical adaptation of the structure with the aid of a principally reflecting layer, a partly transparent layer, and an intermediate layer fitted between them. The structure thus obtained is used as a detector, an emitter, or a reflective surface at a selected wavelength range. The structure can, in addition, be shielded with a shielding layer and the materials of the layers can be selected according to temperature requirements, especially in embodiments that are intended for emitter use.

In order to be able to use the optical structure as an emitter, the structure must withstand the temperature required in emitter use. Typically, in emitter applications temperatures of more than 100° C. are used, which the structure should preferably withstand unchanged for even long periods of time. The operating temperature can also be higher, for example at least 200° C., at least 300° C., or even more than 650° C. The emitter temperatures most usually used are in the range 100-1000° C., for example in the range 200-650° C., such as in the range 250-400° C. Thus, the structure should withstand the design temperature for the application and remain stable in the selected operating temperature range for very long periods of time. At the same time, the structure should permit a good optical matching. When used as a detector, the temperature-resistance demand is less, as the operating temperatures of detectors are typically lower and can even be less than 0° C. In any event, the stability of the structure as a function of time is essential in detector use too. Stability means that the emissivity of the structure remains essentially unchanged at the desired wavelength range in the operating conditions of the structure for the duration of the operating life of the structure. The term stability is defined in more detail later in the description.

More specifically, the layered structure according to the invention is characterized by what is stated in the characterizing portion of claim 1. The manufacturing method according to the invention, and the components and uses according to the invention are, for their part, characterized more specifically by what is stated in claims 14-20. Considerable benefits are achieved by means of the invention. With the aid of the invention, an optical structure is created, which is stable and which can also be manufactured to be suitable for use even at a high temperature.

Compared to the solution according to U.S. Pat. No. 6,177,673, the embodiments of the invention permit, for example, a reduction in the thermal mass of the layered structure. The polycrystalline silicon film of the structure disclosed in the US patent must be made relatively thicker, because the effective refractive index must be reduced, to achieve sufficient lossiness. The manufacture of the structure according to the embodiments of the invention also does not necessarily require the use of ion implantation, making it possible to reduce manufacturing costs. Also in embodiments, in which ion implantation is used, it is possible to reduce the number of ion-implantation stages contained in the manufacturing process with the aid of the embodiments, if this is desired. In addition, the structure according to the invention is more stable at high temperatures.

Optical structures manufactured according to the embodiments of the invention can be used both to emit and absorb electromagnetic radiation. In addition, a layered structure manufactured in a corresponding manner according to the embodiments of the invention can also be used for reflecting electromagnetic radiation, for example, in an optical filter.

The emission and absorption wavelength ranges are situated on top of each other in the same structure and the maximum reflection area is situated at the minimum point of the emissivity. The reflective property can be exploited in the manufacture of electronic devices so that also reflective surfaces, which are manufactured using the same reliable technology as the detector or emitter surfaces, can be designed in an optical device.

With the aid of embodiments of the invention, the efficiency of the structure can also be made high in the desired wavelength range, with the aid of an optical adaptation. In this case, the term efficiency refers to the fact that the emissivity of the structure is close to one.

DESCRIPTION OF THE FIGURES

In the following, the invention will be examined with the aid of examples and with reference to the accompanying figures.

DEFINITIONS

Complex index of refraction refers to the refractive index being examined in complex number form, i.e. taking into account both the real component and the imaginary component of the refractive index. The term complex index of refraction is used especially when both the real component and the imaginary component of the refractive index deviate from zero.

Refractive index refers generally to the refractive index, i.e. the term refractive index consists of both the complex index of refraction and the refractive index, which has only a real component.

A lossy material is a material, which has a complex index of refraction, in which the imaginary component of the refractive index deviates significantly from zero.

Optical loss and absorption refer to a phenomenon, in which radiant energy interacting with a material binds to the material becoming, for example, thermal energy.

Partially transparent refers to the fact that the material or structure in question absorbs one part of the radiant energy and the other part of the radiant energy passes through the material. In addition, a third part of the radiant energy can be reflected from the surface of the material. A partially transparent material is a lossy material.

A black body refers in this document to an idealized physical body, according to the established terminology of physical science.

Emissivity is a relative variable, which expresses a material's surface's ability to emit or absorb radiant energy.

Emissivity expresses the energy radiated by the surface relative to the energy radiated by a black body at the same temperature.

Stability in connection with emissivity refers to the fact that the emissivity of the structure in a wavelength range significant in terms of the application remains substantially unchanged in the operation conditions of the structure during operating life of the structure.

DESCRIPTION OF EMBODIMENTS

Figure 1:
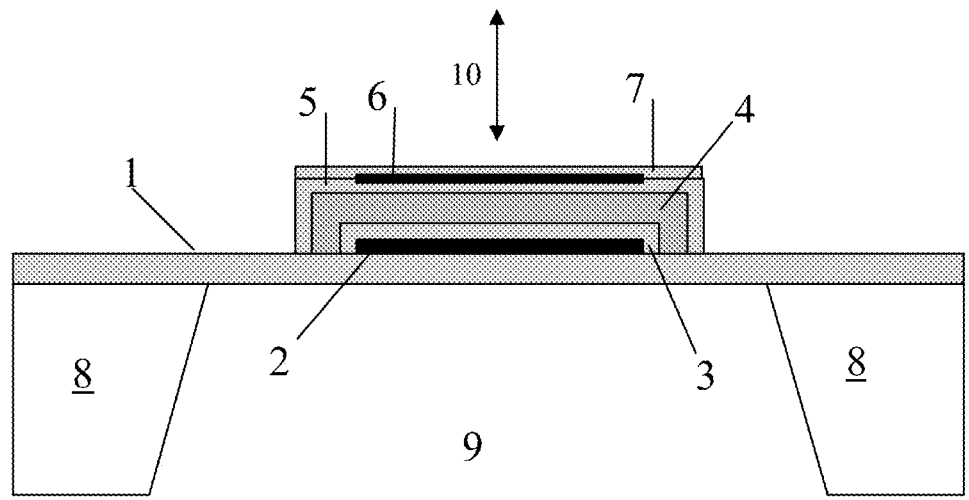
FIG. 1 shows one layered structure according to the invention.

The detector or emitter structure according to FIG. 1 contains a self-supporting shielding layer 1 made on top of a silicon substrate 8, which shielding layer is typically an insulating film, and a reflecting layer 2 made on top of this. In the embodiment of FIG. 1, the reflective layer 2 is manufactured from metal, so that in connection with the embodiment it is possible to speak of a metal mirror 2. On top of the metal mirror 2 is a new shielding layer 3 and on top of this an intermediate layer 4, which in this embodiment is a silicon layer 4. The silicon layer 4 can be manufactured, for example, from polycrystalline silicon, amorphous silicon, or monocrystalline silicon, or a combination of these. In one embodiment the silicon layer 4 consists partially of amorphous polycrystalline silicon. The term silicon is used in this document to refer to all of the aforementioned forms of silicon.

On top of the silicon layer 4 is another shielding layer 5, on top of which is a partially transparent layer 6. In the embodiment of FIG. 1, a semitransparent thin metal film 6 acts as the partially transparent layer 6. The uppermost shielding layer is a silicon nitride layer 7. The substrate 8 is etched away at the location 9. The layered structure can of course be also manufactured on some other substrate, or without a separate substrate. The arrow 10 shows the emission/absorption direction of the structure.

In the example of FIG. 1, the shielding layer 1 is a suitable insulating material, for example silicon nitride. The thickness of the shielding layer is, for example, 50-1000 nanometers, such as 100-200 nanometers. A good material for the metal layer 2 is some heat-resistant metal, for example molybdenum. The thickness of the metal layer 2 can be, for example, 10-1000 nanometers, such as 100-300 nanometers. The shielding layers 3, 5, and 7 are typically of an insulator, for example silicon nitride. The intermediate layer 4 is silicon or alternatively some other material, for example $SiO_2$ or $Si_3N_4$ (or more generally $Si_xN_y$). The partially transparent layer 6 is typically metal, such as molybdenum or wolfram. The thickness of the partially transparent layer 6 can be, for example, 1-30 nanometers, such as 3-10 nanometers.

The partly transparent layer 6 is typically manufactured from a metal, but some other lossy material than metal can also come into question. The possible manufacturing material of the partially transparent layer 6 can be materials, the imaginary component k of the complex index of refraction is, in the operating wavelength of the device, greater than 1, for example greater than 5, and generally greater than 10. The refractive index (complex index of refraction) is thus in the form n+i*k, in which k is referred to as the imaginary component of the refractive index. The imaginary component of the refractive index determines the lossiness, i.e. the absorption in the material. In the refractive index equation shown above, n is the real component of the refractive index. For metals, the imaginary component of the refractive index at the wavelengths of visible light is generally less than 5, but always more than 1. In the infrared range, the imaginary component of the refractive index of metals is, in turn, nearly always at least 5 and generally more than 10.

In the layered structure, the reflective layer 2 and the layers 3, 4, 5, 6, and 7 act together as an optical filter, which can, if desired, be designed to operate with an efficiency of nearly 100% as a detector or an emitter in the desired wavelength range.

In the layered structure of FIG. 1, the insulating films 1, 3, 5, and 7 are supporting and shielding structures, the effect of which on the emissivity of the structure is small. Of course it should be noted that the thicknesses of films 3 and 5 affect the distance between the reflecting layer 2 and the partially transparent layer 6 and thus also the emissivity of the entire structure. The shielding films can also act as electrical insulators. One possible material for the insulating films is silicon nitride. The thickness of the shielding film 7 can be, for example, 40-500 nanometers and of the shielding films 3 and 5, for example, 20-500 nanometers. The shielding films (or shielding layers) are manufactured from a shielding material, which refers to a material that withstands the temperatures required in emitter use. In addition, the shielding material is able at these temperatures to protect the layers 2 and 6 from excessive oxidation, excessive mixing, or some other corresponding relatively rapidly affecting destructive mechanism. Thus, it is possible to improve the stability of the emissivity of the structure. With the aid of a shielding material it is also possible to protect the conductors that are made inside the structure in some embodiments. In addition to the layers shown in the figure, various conductor structures can be connected to the optical component according to whether it is used in a bolometric, thermopile, or thermal radiator. These structures are not shown in the example of the figure, because they do not belong directly to the scope of the present invention. Such conductor structures can be suitably made, for example, inside or between the aforementioned shielding films.

Figure 2:
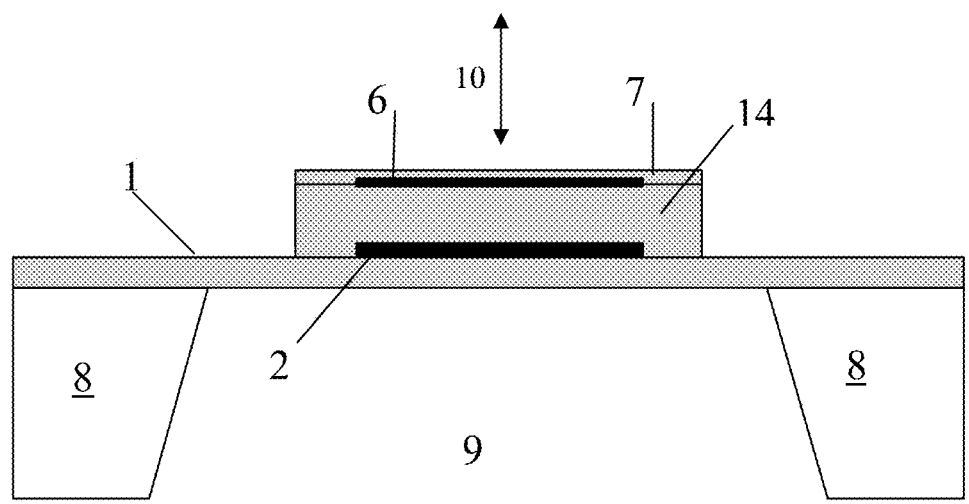
FIG. 2 shows a second layered structure according to the invention.

FIG. 2 shows an alternative structure, in which the shielding layers 3 and 5 and the intermediate layer 4 has been replaced with a single intermediate layer 14, which is manufactured from a shielding material such as silicon nitride. The total thickness of the intermediate layers 3, 4, 5, in FIG. 1 or the intermediate layer 14 in FIG. 2 can be, for example, in the range 50-2000 nanometers. In other words, the distance between layers 2 and 6 can be, for example, 50-2000 nanometers, such as 100-500 nanometers.

Figure 3:
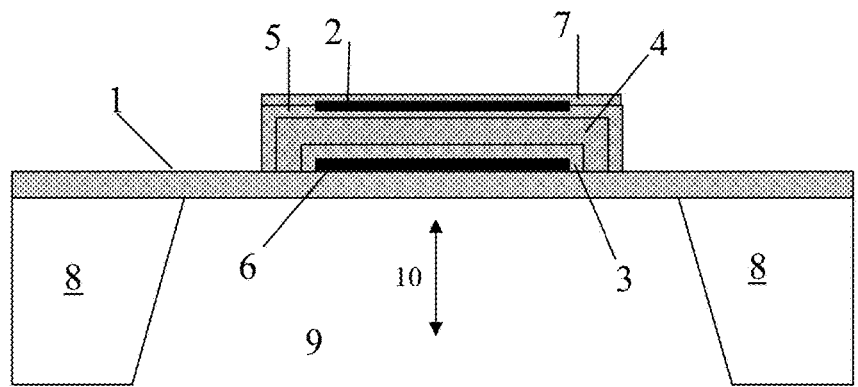
FIG. 3 shows a third layered structure according to the invention.

FIG. 3 shows a second alternative structure, in which the absorption/emission direction of the structure is downwards, according to the alignment of the figure. In the solutions of FIGS. 1 and 2, the absorption or emission takes place according to the alignment shown in the figures in the direction of the upper surface of the structure. In each of FIGS. 1, 2, and 3, the emission/absorption direction is also shown with the aid of an arrow 10. The structure of FIG. 3 corresponds to that of FIG. 1, except that it is as if it were constructed the other way round. The detector or emitter structure according to FIG. 3 contains a self-supporting shielding layer 1 made on top of a silicon substrate 8 and a partially transparent layer 6 made on top of this. On top of the partially transparent layer 6 is a shielding layer 3, on top of this an intermediate layer 4 and further a shielding layer 5. There is a reflecting layer 2 on top of the shielding layer 5. Uppermost there is still one shielding layer 7. The substrate 8 has been etched away at the point 9. The layered structure can of course also be manufactured on some other substrate, or without a separate substrate. The materials themselves and the layer thicknesses can be selected, for example, as depicted in connection with the description of FIG. 1. In addition, in the structure of FIG. 3 it is possible to combine the layers 3, 4, and 5 with a layer 14 in the manner of the embodiment of FIG. 2.

The optical layered structure can thus be manufactured, for example, by means of a method, in which A self-supporting shielding layer 1 is manufactured, A reflecting layer 2 (or alternatively a partly transparent layer 6) is manufactured on top of the self-supporting shielding layer 1. The reflective layer 2 is typically manufactured from a conductive material, such as a metal.

On top of the reflecting layer 2 at least one intermediate layer of a shielding material (layers 3, 4, and 5; or a layer 14 in the example of FIG. 2) is manufactured. A heat-resistant and stable material is chosen as the material of the intermediate layer. The intermediate layer is manufactured to a predefined optical thickness, which is selected on the basis of the refractive indices and thicknesses of the reflective layer 2, the intermediate layer, and the partially transparent layer 6, in such a way that the desired adaptation is achieved at the desired wavelength range. In the design of the optical structure, the imaginary components of the complex indices of refraction of the reflective layer 2 and the partially transparent layer 6 are also taken into account.

A partially transparent layer 6 (alternatively a reflecting layer 2) is manufactured on top of the intermediate layer. This layer is typically manufactured from a metal, which has a high melting point and the conductivity of which is relatively low. In this way, the layer is made durable and practically thick. The partially transparent layer 6 also has a complex index of refraction.

A shielding layer 7 is manufactured on top of the partially transparent layer 6.

Reference has been made above to a complex index of refraction, by which it has been wished to specifically emphasize the fact that, in the case in question, in addition to a real component, the refractive index has also an imaginary component that essentially deviates from zero. In the embodiments described here the possible imaginary component of the refractive index is always taken in to account.

In the layered structures, a chemically passive material, which does not react in the operating-temperature range with the films 2 and 6, is chosen as the material of the support, intermediate, and shielding layers 1, 3, 4, 5, and 7. In addition, the material of the layers 3, 4, 5, and 7 is a material that can be relatively well penetrated by light in the desired wavelength range. In other words, a material that is optically lossless or slightly lossy in the desired wavelength range is chosen as the material. One very good material is silicon nitride. Silicon nitride works well as a passivation layer, i.e. water or oxygen cannot diffuse through the layer. Silicon nitride thus prevents the oxidation of the innermost layers even at high temperatures. Without a shielding layer, particularly thin metal films and metal conductors are easily damaged by oxidation. The metal atoms of layers 2 and 6 also do not diffuse through silicon nitride, so that silicon nitride prevents the layers from mixing with each other. In addition, industrially applicable methods exist for growing silicon nitride. With the aid of silicon-nitride layers, it is possible to achieve operating temperatures of even more than 1000° C. Of course, the support, intermediate, and shielding layers 1, 3, 4, 5, and 7 can also be manufactured from some other material, which meets the corresponding or other requirements demanded by the application. If the operating temperature of the layered structure is designed to be lower, the range of available materials widens. Other materials, which can be considered at least in some embodiments of the layered structure, are, for example, aluminium oxide, silicon oxide, and oxynitride.

In the example of FIG. 1, an intermediate layer 4 is used between the shielding layers 3 and 5. The purpose of the intermediate layer is to locate the partially transparent layer 6 at a suitable distance from the reflecting layer 2. In principle, the intermediate layer can be manufactured in the manner of FIG. 2 together with the shielding layers 3 and 5, but in terms of the practical manufacturing technology it may be easier to use a separately manufactured intermediate layer 4. For example, when using silicon nitride the growing of a sufficiently thick combined layer 3, 4, and 5 may cause problems with stresses forming in the film. The separately manufactured intermediate layer can be of silicon or some other suitable material, for example silicon oxide.

The partially transparent layer 6 is manufactured from a reflecting material, typically a metal. The metal selected should have a high melting point, so that the component will withstand emitter use. Detector use naturally does not have this requirement. So that the properties of the structure will remain stable, the metal layer should remain as unchanged as possible at the operating temperature. In this connection, the term operating temperature refers to the temperature of the active area of the component. It should be stated in addition that the operating temperature of the component may deviate substantially from the ambient temperature, especially in emitter use. In addition, it is beneficial if the material has a reasonably high resistance. Poorer conductivity means a smaller optical loss, so that the layer 6 can be made slightly thicker. When using a highly conductive metal, sufficient lossiness has be achieved even with a film of a thickness of clearly less than 5 nanometers. Such thin films are more difficult to manufacture accurately and reliably on an industrial scale. Materials with these criteria that are very suitable for manufacturing the partly transparent layer 6 are, for example, molybdenum and wolfram. Other materials too, for example platinum, or compounds containing suitable metals, can be used in some embodiments.

The metal layers can be patterned, for example by means of an etching or lift-off process, to be films 2 and 6 of a predefined size, when the metallic thermal conductor between the emitter or detector area and the substrate 8 is eliminated. In the structure, only the support and shielding layer 1, as well as the heating and/or the measuring conductors (not shown in the figures) act as a thermal conductor in the direction of the substrate. Thus, the structure permits relatively good thermal insulation, which improves the efficiency and frequency properties of the component, in both emitter and detector operation.

In a practical application, the layered structure is matched optically to the selected wavelength range of the electromagnetic radiation. Typically, this wavelength radiation range is situated in the range of infrared radiation or of visible light. The partially transparent layer 6 is designed according to the matching conditions, so as to achieve the desired matching.

The reflecting layer 2 can be manufactured from a suitably heat-resistant and reflecting material, for example from molybdenum or wolfram. The material of the reflecting layer 2 can also be extremely conductive, as the layer does not need to allow light to penetrate. The reflecting layer 2 can also be made clearly thicker than the layer 6. Thus the material of the reflecting layer 2 can be chosen from a clearly larger group of materials. The reflecting layer 2 is made sufficiently thick, so that the transmission of optical radiation through the layer 2 does not exist, or at least is extremely small. On the other hand, it is not worth making the layer 2 very much thicker than the aforementioned limit value, as an unnecessarily thick layer needlessly increases the thermal mass of the layered structure and thus weakens the frequency properties of the component.

The layered structure is thus matched optically to its environment, in such a way that the emissivity is brought to the desired level at the desired wavelength range. The desired level can be, for example, quite low, or close to unity (1), i.e. close to 100% efficiency. However, typically the goal is to achieve a clear emissivity peak in the spectrum of the structure, so that the structure is selective relative to wavelength. The emissivity of the peak can be designed to be, for example, in the range 0.3-1, such as in the range 0.5-0.99. In some applications, for example an emissivity of 0.4 at the emissivity peak is entirely sufficient, but in some other applications an emissivity of more than 0.75 or more than 0.9 is aimed at. In most embodiments and applications what is important is not, however, so much how high an emissivity is achieved, but in terms of the operation of the application the decisive factor is that the emissivity remains stable as a function of time. Often it is more important that the location of the emissivity peak does not change as a function of time and that emissivity also does not substantially increase or decrease during operation. In addition, essential for most applications is the fact that the shape of the emissivity curve remains essentially unchanged in the wavelength range that is essential in terms of the application.

Matching the parameters of the structure to a practical application can be made experimentally by seeking suitable process parameters, by which the desired emissivity is achieved. For the matching, it is also possible to use computational methods and commercially available computer programs, with the aid of which values are calculated for the layer thicknesses to be used with the selected materials. After this, components can be manufactured, the properties of the components measured, and if necessary the final result can be improved iteratively.

Optical wave impedance theory can be exploited in the calculation. The calculation of the optical properties of thin films is described, for example, in the book O. S. Heavens: Optical Properties of Thin Solid Films, Dover Publications Inc., New York, 1954. One skilled in the art can calculate values for suitable film thicknesses according to the principles presented in the present patent publication and by using the theory presented in the aforementioned literature reference (O. S. Heavens).

Figure 4:
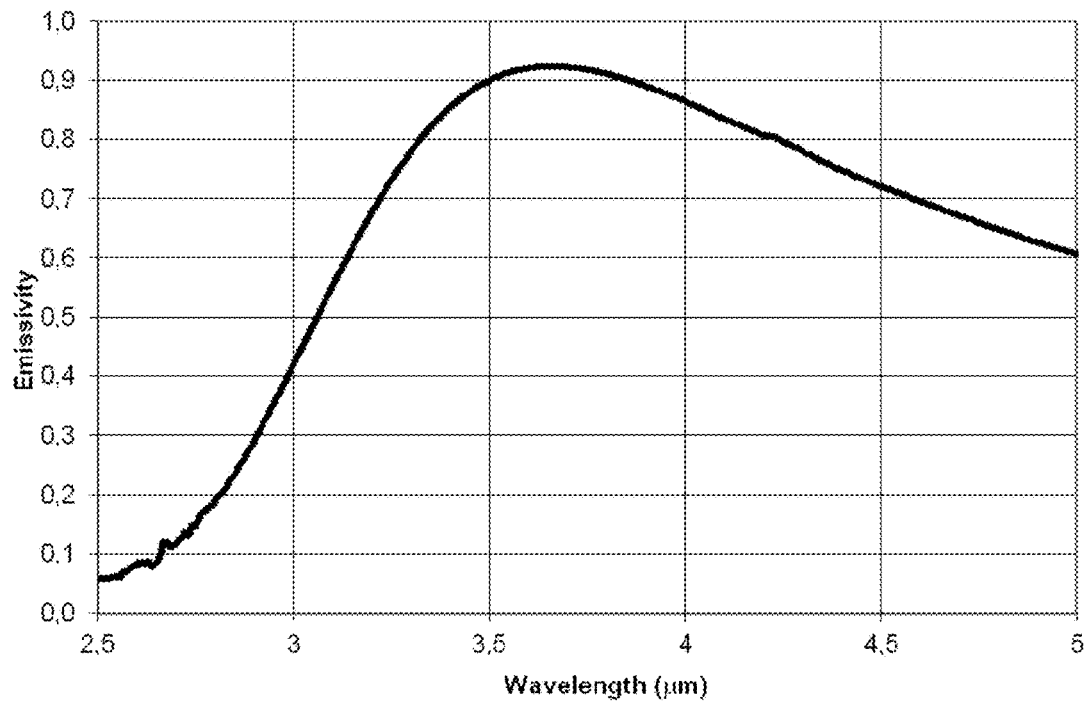
FIG. 4 shows the emissivity measured from one layered structure according to the invention, as a function of wavelength.

FIG. 4 shows an example of an emissivity curve, which is measured from one layered structure according to the example of FIG. 1. This emissivity or emissivity curve should thus remain stable with a substantial accuracy, at the wavelength range essential in terms of the application.

Figure 5:
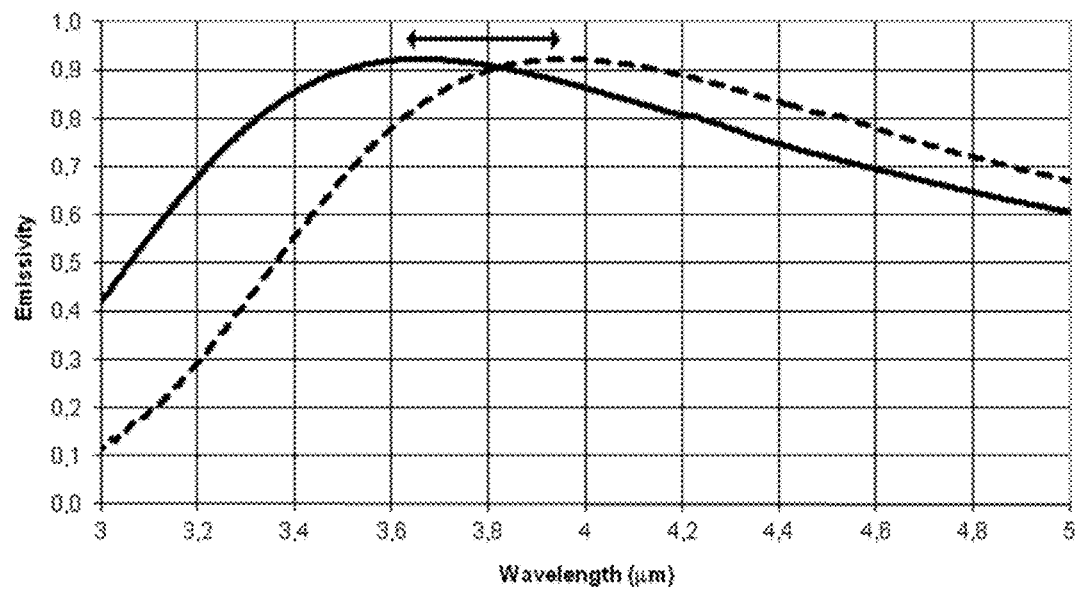
FIG. 5 shows, by way of example, the displacement of the emissivity in the direction of the wavelength axis.

FIG. 5 shows the displacement of emissivity in the direction of the wavelength axis.

In the figure, the solid line shows the original emissivity curve and the broken line the displaced emissivity curve. For its part, the arrow shows the displacement. The magnitude of the acceptable displacement of the emissivity peak depends, of course, on the application, but generally it is possible to say that in the embodiments the maximum displacement is generally less than 10%, preferably less than 5%, and in the most accurate embodiments less than 1% of the wavelength of the emissivity peak.

Figure 6:
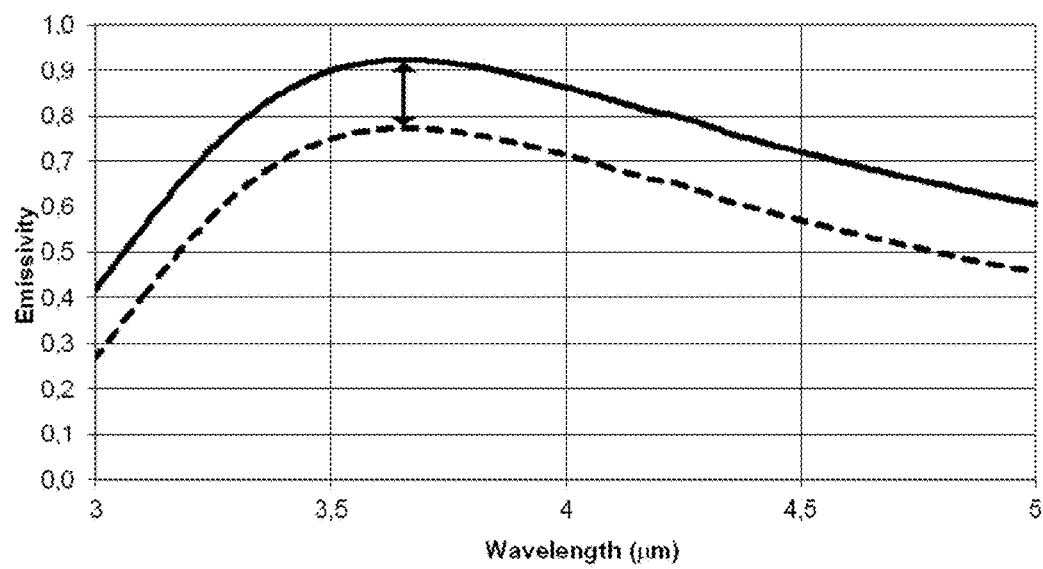
FIG. 6 shows, by way of example, the displacement of the emissivity in the direction of the vertical axis.

FIG. 6 shows the displacement of emissivity in the direction of the vertical axis. In the figure, the solid line shows the original emissivity curve and the broken line the displaced emissivity curve. For its part, the arrow shows the displacement. The magnitude of the acceptable displacement of the emissivity peak depends, of course, on the application, but generally it is possible to say that in the embodiments the maximum displacement in the vertical direction (i.e. typically the reduction of the level of emissivity) is generally less than 50%, preferably less than 20%, and in the most accurate embodiments less than 5% of the original emissivity at the original wavelength of the emissivity peak.

Figure 7:
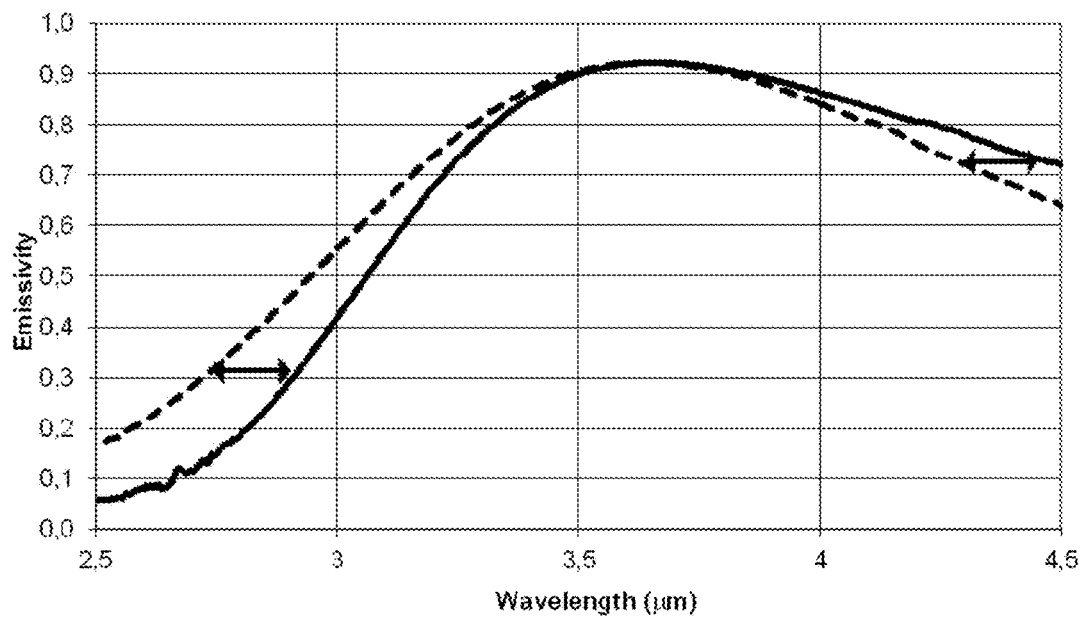
FIG. 7 shows, by way of example, the change in the shape of the emissivity curve.

FIG. 7 shows a change in the shape of the emissivity curve. In the figure, the solid line shows the original emissivity curve and the broken line the displaced emissivity curve. For its part, the arrow shows the displacement. In this example, the location of the emissivity peak on the wavelength axis and the emissivity at the emissivity peak remain as before, but the emissivity changes at shorter and longer wavelengths. The magnitude of the acceptable displacement of the emissivity depends, of course, on the application, but generally it is possible to say that in the embodiments the maximum displacement vertically (increase or decrease of emissivity) is generally less than 10%, preferably less than 5%, and in the most accurate embodiments less than 1% at each wavelength through the entire wavelength range defined for the application.

Figure 8:
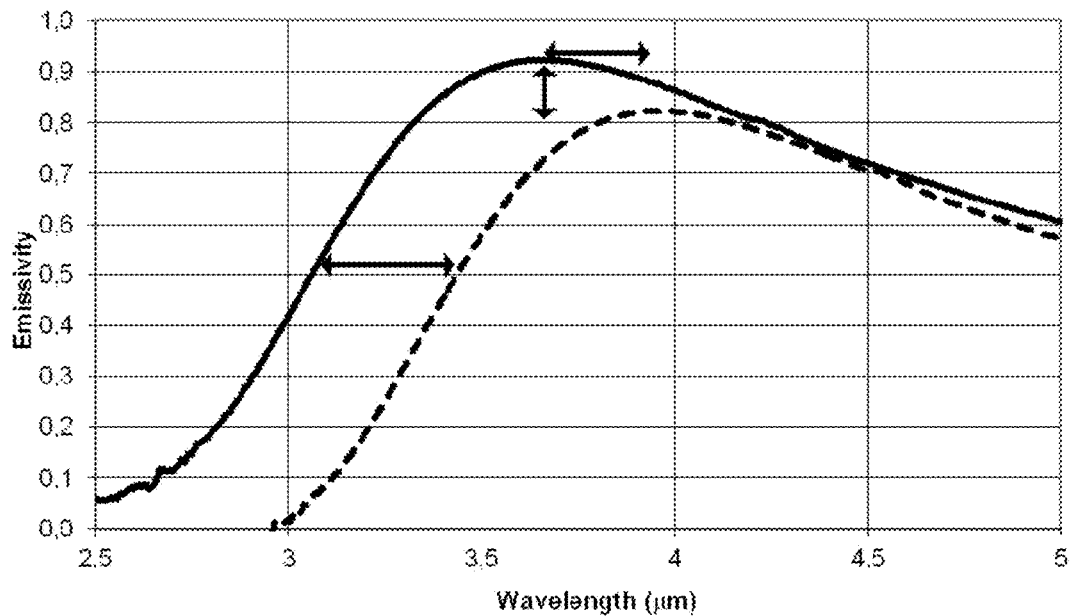
FIG. 8 shows, by way of example, the total displacement, which consists of the displacement of emissivity in the direction of the wavelength axis and in the direction of the vertical axis, as well as the change in the shape of the curve.

FIG. 8 shows the total displacement of the wavelength range essential in terms of the application, which consists of the displacement of emissivity in the direction of the wavelength range (cf. FIG. 5) and the displacement of emissivity in the direction of the vertical axis (cf. FIG. 6), as well as to some extent the change in the shape of the curve (cf. FIG. 7). In the figure, the solid line shows the original emissivity curve and the broken line the displaced emissivity curve. For its part, the arrow shows the displacement. The magnitude of the acceptable displacement can be defined for example so that the displacement must remain within the limits shown in connection with FIG. 5 and within the limits shown in connection with FIG. 6. Another way to express the magnitude of the acceptable displacement is to use the limit values shown in connection with FIG. 7.

In terms of emissivity, making a stable emitter structure has been very difficult using solutions according to the prior art, because the emitter should operate at a relatively high temperature. As the layered structure and its materials are for long periods of time at a high temperature, the properties of the materials, for example the refractive index, easily change.

In the structures according to the examples, it is possible to adjust the emissivity primarily with the aid of the optical distance between the partially transparent layer 6 and the reflecting layer 2 and the optical loss of the partially transparent layer 6. The said optimal distance is, in turn, defined from the thickness of the intermediate layer 14 or layers 3, 4, 5, and the refractive index of the material (refractive indices of the materials, if there are several materials). The reflective layer 2 is made of material layer, the reflective index of which is sufficiently large at the desired wavelength range. A suitable layer is, for example, a sufficiently thick metal layer.

Other advantages that can be gained by suitably designing the structure are a good thermal insulation and a small thermal mass (permits a high cut-off frequency). The layered structure also does not absorb moisture, on account of which the spectral response of the structure does not depend on moisture. The structure also withstands high temperatures, if it is designed to be used at a high temperature.

As has already been stated above, the manufactured structures can be used, for example, in electronic devices for absorbing (detector use), emitting (emitter use), and/or reflecting (filter use) electromagnetic radiation. As an absorber the structure can thus be used, for example, in a radiation detector and as an emitter in a structure that emits electromagnetic radiation. Corresponding structures can be in the same device also for both purposes, for example in such a way that by means of a first component a radiation signal is emitted to a medium, such as air, and by means of a second component the radiation signal that has travelled through the medium is detected. In filter use, the radiation signal can be reflected with the aid of the structure selectively in a manner defined by the emissivity, so that the shape of the spectrum of the reflected signal changes.

According to one embodiment, an emitter component is manufactured, which comprises any of the layered structures described above and possible means for heating the layered structure for forming the electromagnetic radiation to be emitted. Such heating means for the layered structure can comprise, for example, heating resistances connected to the layered structure, with the aid of electric current fed to which the layered structure is heated. So-called optical pumping can also be used for heating the layered structure, when a light source, for example a laser, which is aimed at the layered structure to heat it, is used as the heating means.

According to a second embodiment, a detector component is manufactured, which comprises the layered structure described above as well as means connected to the layered structure for measuring the temperature of the layered structure. For example, thermocouples connected in series can be used as temperature measuring means.

According to a third embodiment, a filter, i.e. a reflector component is manufactured, which is suitable for reflecting electromagnetic radiation, in such a way that the reflective index changes as a function of the wavelength of the radiation being reflected.

Within the scope of the invention, solutions deviating from the embodiments can also be envisaged. For example, it is possible to manufacture several intermediate layers 4 and shielding layers 1, 3, 5, and 7 in the layered structure. Several partially transparent layers 6 can also be manufactured, in such a way that these layers are separated to correspond to the example of FIG. 1 or 2 each by its own intermediate layer 3, 4, 5 (FIG. 1), or 14 (FIG. 2).

It is not intended to restrict the invention to relate to only the examples described above, but instead the patent protection should be examined to the full extent of the accompanying Claims.

The invention claimed is:

1. A layered structure suitable for infrared emitter use, comprising:
   a reflecting layer which has a first surface and a second surface, and
   an optical structure on the second surface of the reflecting layer having at least one partially transparent layer as well as at least one intermediate layer, wherein the partially transparent layer is located at a distance from the reflective layer,
   wherein the at least one partially transparent layer is manufactured from a material having an imaginary component of a complex index of refraction larger than 1 at least in the wavelength range of infrared radiation.

2. The layered structure according to claim 1, wherein the imaginary component of the complex index of refraction is larger than 5.

3. The layered structure according to claim 1, wherein at least one partially transparent layer is manufactured from metal.

4. The layered structure according to claim 1, further comprising at least one shielding layer, and wherein the at least one partially transparent layer is located between the shielding layer and the at least one intermediate layer.

5. The layered structure according to claim 1, further comprising:
   a self-supporting shielding layer which is manufactured of a shielding material on the first surface of the reflecting layer, and
   at least one second shielding layer on the surface of the at least one partially transparent layer which is manufactured from a shielding material, and
   wherein the partially transparent layer is located between the at least one second shielding layer and at least one intermediate layer.

6. The layered structure according to claim 1, wherein the at least one intermediate layer is manufactured from a shielding material.

7. The layered structure according to claim 1, wherein the at least one intermediate layer consists essentially of unalloyed silicon.

8. The layered structure according to claim 1, wherein the at least one intermediate layer has at least three layers including:
   a first layer against the reflecting layer which is manufactured from a first shielding material,
   a second layer against the at least one partially transparent layer which is manufactured from the first or a second shielding material, and
   wherein between the first and second layer is at least a third layer which is manufactured from a third material.

9. The layered structure according to claim 1, further comprising shielding layers manufactured from a shielding material, wherein the shielding layers enclose inside them the at least one partially transparent layer and the reflecting layer.

10. The layered structure according to claim 1, wherein the reflecting layer is manufactured from metal.

11. The layered structure according to claim 1, wherein the at least one partially transparent layer consists essentially of molybdenum or wolfram.

12. The layered structure according to claim 1, wherein the thickness of the partially transparent layer is less than 30 nanometers.

13. The layered structure according to claim 1 wherein the structure is adapted to withstand unchanged a temperature of more than 100° C.

14. The layered structure according to claim 1 wherein the structure is adapted to withstand unchanged a temperature of more than 300° C.

15. The layered structure according to claim 4, wherein the at least one shielding layer consists essentially of silicon nitride.

16. An infrared emitter device, comprising:
   a layered structure having a reflecting layer which has a first surface and a second surface, and an optical structure on the second surface of the reflecting layer having at least one partially transparent layer as well as at least one intermediate layer, wherein the partially transparent layer is located at a distance from the reflective layer, and the at least one partially transparent layer is manufactured from a material having an imaginary component of a complex index of refraction larger than 1 at least in the wavelength range of infrared radiation, and a means for heating the layered structure.

17. The infrared emitter device according to claim 16, wherein the means for heating the layered structure comprises at least one heating resistance permanently manufactured into the layered structure.

18. The infrared emitter device according to claim 16, wherein the means for heating the layered structure comprises a radiation source which is arranged to heat the layered structure.

19. A detector component, comprising:

a layered structure having a reflecting layer which has a first surface and a second surface, and an optical structure on the second surface of the reflecting layer having at least one partially transparent layer as well as at least one intermediate layer, wherein the partially transparent layer is located at a distance from the reflective layer, and the at least one partially transparent layer is manufactured from a material having an imaginary component of a complex index of refraction larger than 1 at least in the wavelength range of infrared radiation, and a means for measuring the temperature of the layered structure.

20. The detector component according to claim 19, wherein the means for measuring the temperature of the layered structure comprise at least one conductor structure permanently manufactured into the layered structure.

* * * * *